United States Patent
Nguyen et al.

(10) Patent No.: US 6,823,016 B1
(45) Date of Patent: *Nov. 23, 2004

(54) METHOD AND SYSTEM FOR DATA MANAGEMENT IN A VIDEO DECODER

(75) Inventors: Hungviet Nguyen, Fremont, CA (US); Xiaoping Hu, San Jose, CA (US); Kuei-Chung Tu, San Jose, CA (US); Yan Liu, San Jose, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,014

(22) Filed: Feb. 20, 1998

(51) Int. Cl.[7] .................................................. H04B 1/66
(52) U.S. Cl. ................................................. 375/240.25
(58) Field of Search ....................... 375/240.25, 240.01, 375/240.2, 240.21, 240.22; 382/236, 232, 276; 348/441, 442, 532, 569, 231, 459, 445; 395/500; H04B 1/66

(56) References Cited

U.S. PATENT DOCUMENTS

| | | | |
|---|---|---|---|
| 4,121,283 A | 10/1978 | Walker | 364/200 |
| 4,346,377 A | 8/1982 | Green | 340/731 |
| 4,382,254 A | 5/1983 | Ranalli | 340/744 |
| 4,399,435 A | 8/1983 | Urabe | 340/750 |
| 4,418,344 A | 11/1983 | Brown | 340/726 |
| 4,471,465 A | 9/1984 | Mayer et al. | 364/900 |
| 4,488,254 A | 12/1984 | Ward | 364/900 |
| 4,531,160 A | 7/1985 | Ehn | 358/240 |
| 4,569,019 A | 2/1986 | DiOrio et al. | 364/410 |
| 4,644,495 A | 2/1987 | Crane | 364/900 |
| 4,700,182 A | 10/1987 | Ohgami | 340/750 |
| 4,737,772 A | 4/1988 | Nishi et al. | 340/703 |
| 4,751,502 A | 6/1988 | Ishii et al. | 340/709 |
| 4,760,387 A | 7/1988 | Ishii et al. | 340/716 |
| 4,763,118 A | 8/1988 | Takai | 340/735 |
| 4,779,083 A | 10/1988 | Ishii et al. | 340/767 |
| 4,821,226 A | 4/1989 | Christopher et al. | 364/900 |
| 5,028,917 A | 7/1991 | Imanishi et al. | 340/793 |
| 5,030,946 A | 7/1991 | Yamamura | 340/750 |
| 5,065,346 A | 11/1991 | Kawai et al. | 395/128 |
| 5,122,792 A | 6/1992 | Stewart | 340/793 |

(List continued on next page.)

Primary Examiner—Tung T. Vo
(74) Attorney, Agent, or Firm—Thelen Reid & Priest LLP; David B. Ritchie

(57) ABSTRACT

A method and system for minimizing bus traffic in a video decoder is disclosed. A method and system for processing a portion of a reference picture includes designating the reference picture, selecting a display picture within the reference picture, transmitting a display picture size, and sending a display picture offset. A method and system for compressing IDCT coefficients corresponding to a macroblock, the macroblock having a plurality of blocks, includes locating each non-zero IDCT coefficient corresponding to one of the plurality of blocks, assigning an index to the non-zero IDCT coefficient, the index designating a location within the one of the plurality of blocks, packing the non-zero IDCT coefficient in little endian format, and specifying a terminator bit corresponding to the non-zero coefficient, the terminator bit indicating the end of all non-zero IDCT coefficients for the one of the plurality of blocks. A method and system for selectively controlling each hardware device within a video decoder includes obtaining a video stream, performing VLC decoding, encoding a plurality of instructions to control each hardware device within the video decoder, decoding each one of the plurality of instructions, and optionally performing an IDCT in response to each one of the plurality of instructions.

20 Claims, 6 Drawing Sheets

U.S. PATENT DOCUMENTS

| | | | | |
|---|---|---|---|---|
| 5,138,305 A | | 8/1992 | Tomiyasu | 340/717 |
| 5,274,794 A | * | 12/1993 | Ewing et al. | 395/500 |
| 5,355,465 A | | 10/1994 | Yoshida | 395/425 |
| 5,594,467 A | * | 1/1997 | Marlton et al. | 345/115 |
| 5,654,759 A | * | 8/1997 | Augenbraun et al. | 375/240.03 |
| 5,675,387 A | * | 10/1997 | Hoogenboom et al. | 348/416.1 |
| 5,754,243 A | * | 5/1998 | Kurihara et al. | 348/445 |
| 5,774,600 A | * | 6/1998 | Strongin et al. | 382/276 |
| 5,815,646 A | * | 9/1998 | Purcell et al. | 395/163 |
| 5,905,839 A | * | 5/1999 | Yanagihara et al. | 386/26 |
| 5,905,840 A | * | 5/1999 | Ohtani | 386/44 |
| 5,907,372 A | * | 5/1999 | Oku et al. | 348/716 |
| 5,940,016 A | * | 8/1999 | Lee | 341/67 |
| 5,963,222 A | * | 10/1999 | Cheney et al. | 345/516 |
| 5,969,770 A | * | 10/1999 | Horton | 348/569 |
| 5,970,173 A | * | 10/1999 | Lee et al. | 382/236 |
| 5,987,180 A | * | 11/1999 | Reitmeier | 382/236 |
| 6,058,463 A | | 5/2000 | Langan et al. | 711/202 |
| 6,061,400 A | * | 5/2000 | Pearlstein et al. | 375/240 |
| 6,084,633 A | * | 7/2000 | Gouhara et al. | 348/231 |
| 6,104,434 A | | 8/2000 | Nakagawa et al. | 348/403 |
| 6,151,075 A | * | 11/2000 | Shin et al. | 348/459 |
| 6,405,273 B1 | | 6/2002 | Fleck et al. | 710/131 |

* cited by examiner

METHOD AND SYSTEM FOR DATA MANAGEMENT IN A VIDEO DECODER

BACKGROUND OF THE INVENTION

1. Field of the Invention

The present invention relates to a command queue manager. More particularly, the present invention relates to a method and system for minimizing bus traffic in a video decoder.

2. The Background Art

With the merging of personal computer systems and entertainment systems, digital component video and audio were developed. Typically, this audio and video data are encoded into a compressed program stream for transmission. A stream demultiplexer parses the incoming program stream into audio and video bitstreams. When video frames are ultimately displayed, there must be a decompression of these compressed video bitstreams. A video decoder is used for this decompression, or decoding, process.

According to the MPEG-2 video compression standard, the compression ratio can be as high as 50 to 1. Similarly, decompression expands data up to 50 times. This high data rate, as well as the high video window resolution of MPEG-2 decoding, puts heavy demands on the video system. Moreover, at the present time, a video decoder must accomodate a frame rate of approximately 30 frames per second.

Traditionally, software sends video data to a video decoder implemented entirely in hardware. If the entire decoder is built in hardware, then only a compressed data stream is needed. As a result, a decoder built entirely in hardware is extremely fast. However, the hardwired decoder is inflexible as well as complex, which makes the debugging process extremely difficult. In addition, the hardwired decoder requires numerous gates, resulting in a costly system.

Software can be used to provide greater versatility. However, software is computation intensive, and results in a substantial increase in bus traffic. Accordingly, a need exists for a video decoder which provides greater flexibility than the hardwired decoder while minimizing bus traffic and reducing hardware costs.

BRIEF DESCRIPTION OF THE INVENTION

According to a first aspect of the present invention, a method and system for selectively controlling each hardware device within a video decoder includes obtaining a video stream, performing Variable Length Coding (VLC) decoding, on the video stream, encoding a plurality of instructions to control each hardware device within the video decoder, decoding each one of the plurality of instructions, and controlling each hardware device in response to the plurality of instructions. Since the decoder of the present invention comprises hardware and software, greater versatility than traditional hardwired decoders is achieved while manufacturing costs are substantially reduced. Thus, the decoder has the flexibility to control the hardware devices through the use of an instruction set. Since the software portion of the video decoder can instruct the hardware to perform operations that the data stream requires, various instructions can be used to control the hardware to compensate for various problems with a data stream, or substitute software functions in place of non-functional hardware devices. Moreover, since the CPU in a desktop or laptop computer environment can be used to process a portion of the decoding steps at the beginning of the process, it is beneficial to take advantage of this added processing power.

According to a second aspect of the present invention, a method and system for compressing Inverse Discrete Cosine Transform (IDCT) coefficients corresponding to a macroblock, the macroblock having a plurality of blocks, includes locating each non-zero IDCT coefficient corresponding to one of the plurality of blocks, assigning an index to each non-zero IDCT coefficient, the index designating a location within the one of the plurality of blocks, packing each non-zero IDCT coefficient in little endian format, and specifying a terminator bit corresponding to each non-zero coefficient, the terminator bit indicating the end of all non-zero IDCT coefficients for the one of the plurality of blocks. Since the IDCT coefficients are packed in this manner, bus traffic is decreased and efficiency of the decoder is increased.

According to a third aspect of the present invention, a method and system for processing a portion of a reference picture includes designating the reference picture, selecting a display picture within the reference picture, transmitting a display picture size, and sending a display picture offset. This method allows panning and shifting of a display window selected by a user within a reference picture. Therefore, the present invention provides greater flexibility than systems limiting the display picture size to that of the reference picture. Furthermore, only the display picture data rather than the reference picture data must be processed, resulting in a more efficient decoder.

DETAILED DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

Figure 1:
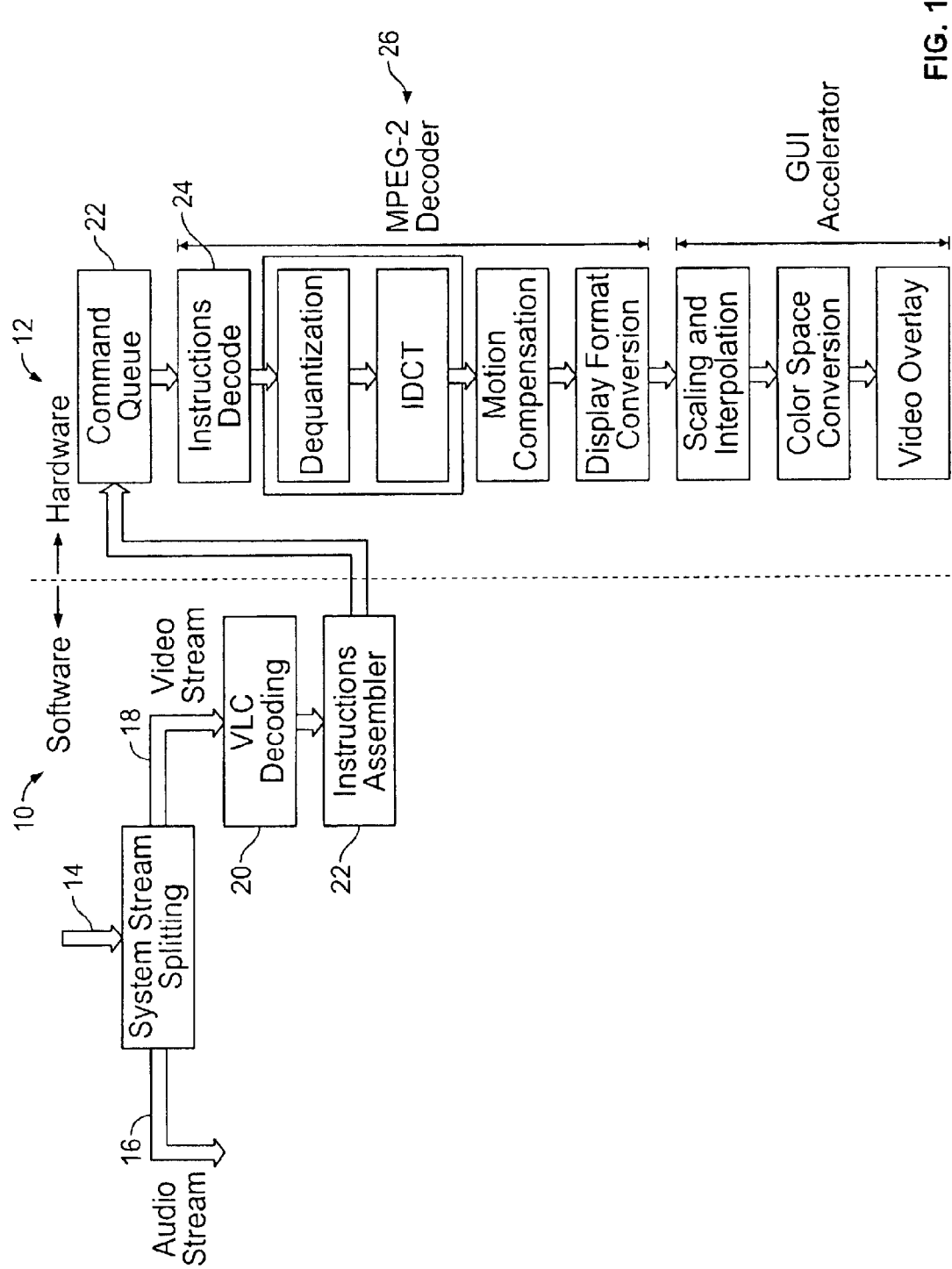
FIG. 1 illustrates a data flow diagram of an MPEG-2 decoder according to a presently preferred embodiment of the present invention.

The present invention provides a method and apparatus for distributing commands in a video decoder. According to a first aspect of the present invention, the MPEG-2 decoder comprises hardware and software to provide greater versatility than hardwired decoders. Referring first to FIG. 1, a data flow diagram of an MPEG-2 decoder according to a presently preferred embodiment of the present invention is illustrated. The MPEG-2 decoder is partitioned into software 10 and hardware 12. The front end of the decoding process comprises software, while the back end comprises hardware. A system stream 14 comprises an audio stream 16 and a video stream 18. Once the system stream 14 is split, Variable Length Coding (VLC) decoding 20 is performed on the video stream 18. Next, an instructions assembler 22, receives information comprising data and instructions from a host. This information is then compressed into a packed data format and stored in a command queue stored in a frame buffer 22. A command queue manager 24 then unpacks the data in the frame buffer, decodes the commands, and sends appropriate signals to corresponding hardware devices 26 capable of performing dequantization, IDCT, motion compensation, display format conversion, color space conversion, scaling and interpolation, and video overlay to complete the decoding process. The instructions are executed by the command queue manager 24 in the order the instructions are stored within the frame buffer 22. Therefore, an instruction set may be modified to provide flexibility and allow the command queue manager to control each hardware block. Moreover, the instruction set is provided to transmit only necessary information across the bus. For example, IDCT coefficients are transmitted in a compact form to maximize efficiency. Thus, bus traffic resulting from the added software is minimized without compromising the quality of the decoder.

Figure 2:
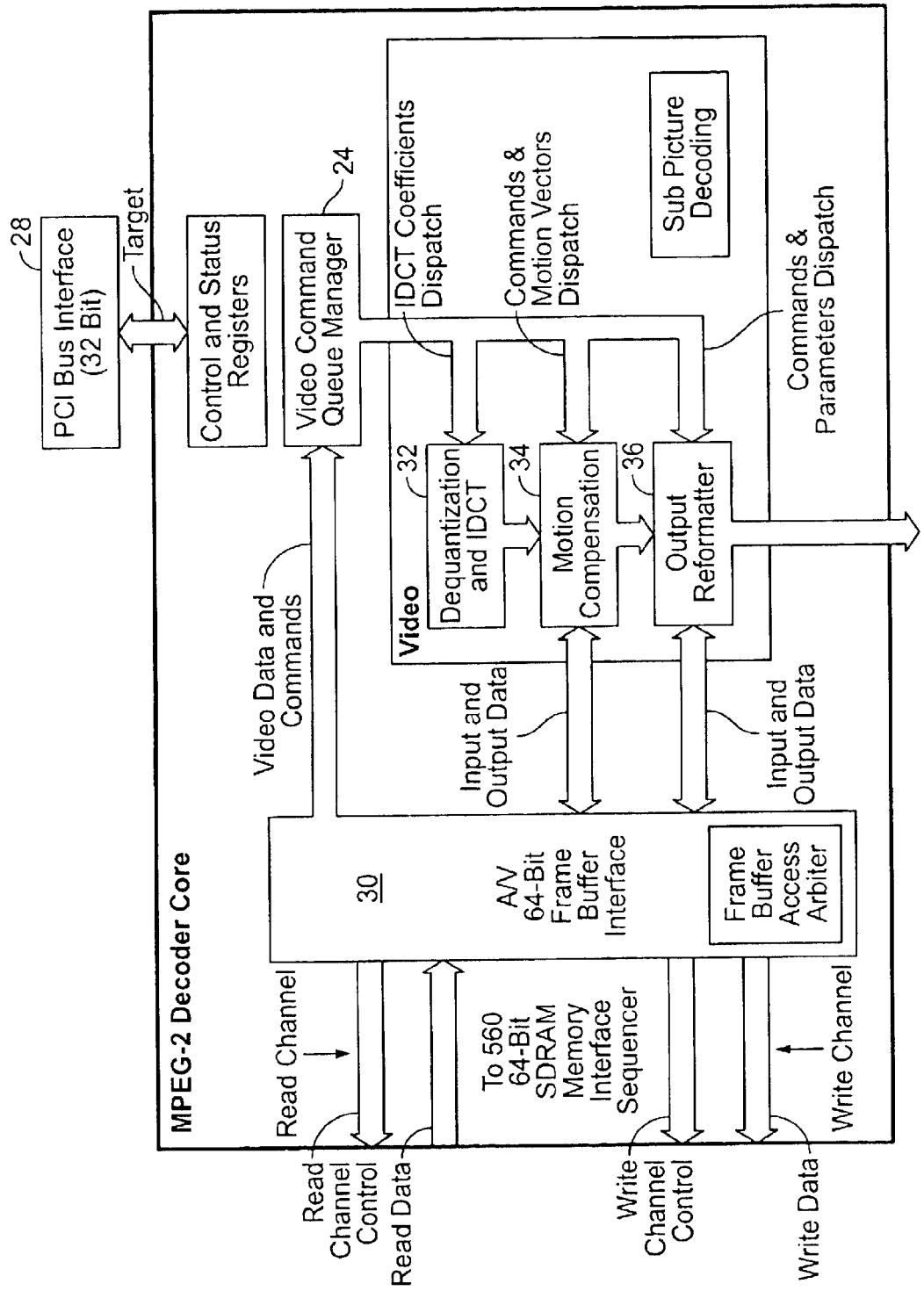
FIG. 2 illustrates a block diagram of an MPEG-2 decoder according to a presently preferred embodiment of the present invention.

Referring now to FIG. 2, a block diagram of an MPEG-2 decoder according to a presently preferred embodiment of the present invention is shown. As illustrated, a 32 bit PCI bus 28 interfaces with a CPU and a 560 64-bit SDRAM memory interface sequencer for writing to and reading data from a frame buffer. The command queue manager 24 fetches commands and data from the frame buffer through a frame buffer interface 30. It then decodes the commands and dispatches data to one of three major video blocks: dequantization and IDCT 32, Motion Compensation 34, and Reformatter 36. For example, the video command queue manager 24 sends IDCT coefficients and a dequantization table to a Dequantization and IDCT block 32. Similarly, the command queue manager 24 sends commands and motion vectors to a Motion Compensation block 34, and commands and parameters to an Output Reformatter 36. The Output Reformatter block 36 is adapted for converting a 4:2:0 macroblock format to a 4:2:2 scan line format. IDCT and Motion Compensation are known in the art of video decoding. According to a presently preferred embodiment of the present invention, implementations of various IDCT algorithms may be provided in software. In this manner, the IDCT commands may be selectively bypassed during testing. Moreover, software may be used as a substitute for the IDCT block, or other hardware block, when the hardware block is not functioning properly.

The command queue 22, shown in FIG. 1, is implemented in frame buffer memory. According to a presently preferred embodiment, four address pointers are used to manage the data stored in the command queue. Top and bottom address pointers define the area in memory allocated for the video command queue. In addition, head and tail address pointers define the data stored within the video command queue, and are updated accordingly. The video command queue manager tracks all the address pointers and determines where to fetch the commands and data. The software updates the tail pointer as it stores data in the video command queue, and the hardware will update the head pointer as it removes data from the video command queue. According to a presently preferred embodiment of the present invention, if the number of valid data words in the command queue is less than a specified number, the command queue manager will interrupt the CPU.

Commands and data are packed in the frame buffer and an instruction set is set forth to allow the command queue manager to identify and interpret these commands. The commands are then sent to the appropriate hardware block. According to a presently preferred embodiment of the present invention, the command queue is 64 bits wide. Similarly, each instruction is a multiple of 32-bit words. Therefore, each word in the command queue can store up to 2 instructions.

Figure 3:
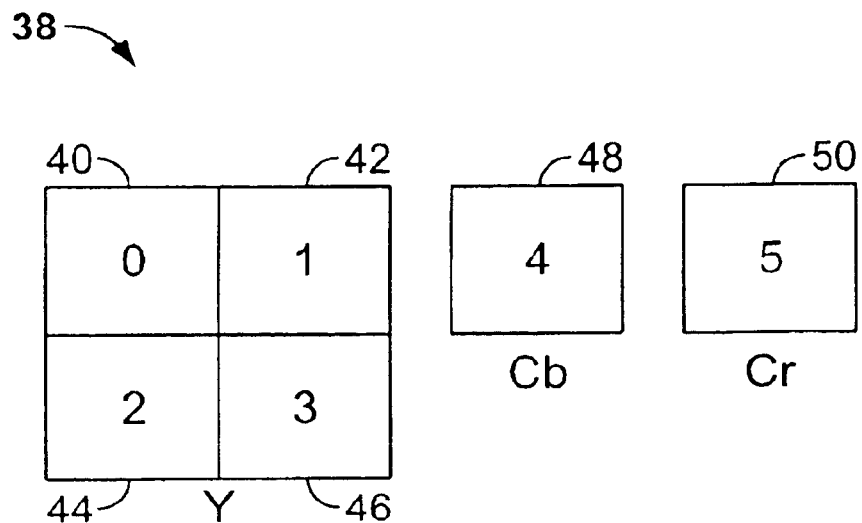
FIG. 3 illustrates a macroblock numbering system according to a presently preferred embodiment of the present invention.
Figure 4:
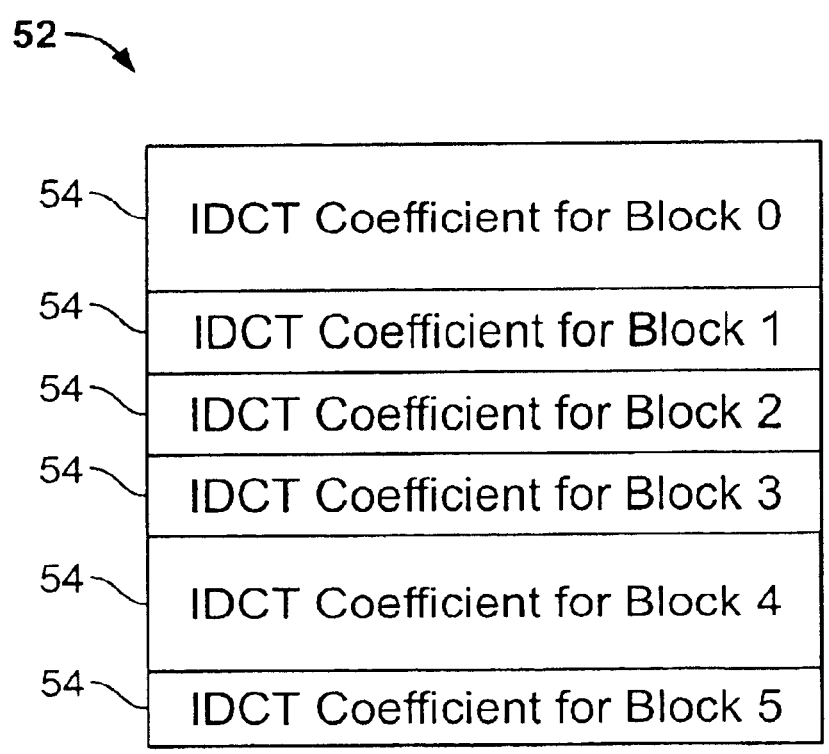
FIG. 4 illustrates a series of non-zero IDCT coefficients corresponding to one macroblock.

According to a second aspect of the present invention, a method for packing IDCT coefficients is presented. Referring now to FIG. 3, a macroblock numbering system according to a presently preferred embodiment of the present invention is presented. Each macroblock 38 is processed individually. Each macroblock comprises 6 blocks 40–50, numbered 0, 1, 2, 3, 4, and 5, corresponding to Y, Cb and Cr color space components, respectively. According to a presently preferred embodiment of the present invention, only non-zero IDCT coefficients are packed and transferred to a dequantization block. Therefore, a maximum of 64 IDCT coefficients may be transferred for each block within the macroblock. As shown in FIG. 4, a series of non-zero IDCT coefficients corresponding to one macroblock 52 are presented. Non-zero IDCT coefficients corresponding to each block are stored sequentially by block 54. IDCT coefficients for each block 0, 1, 2, 3, 4, and 5 are sequentially stored.

Figure 5:
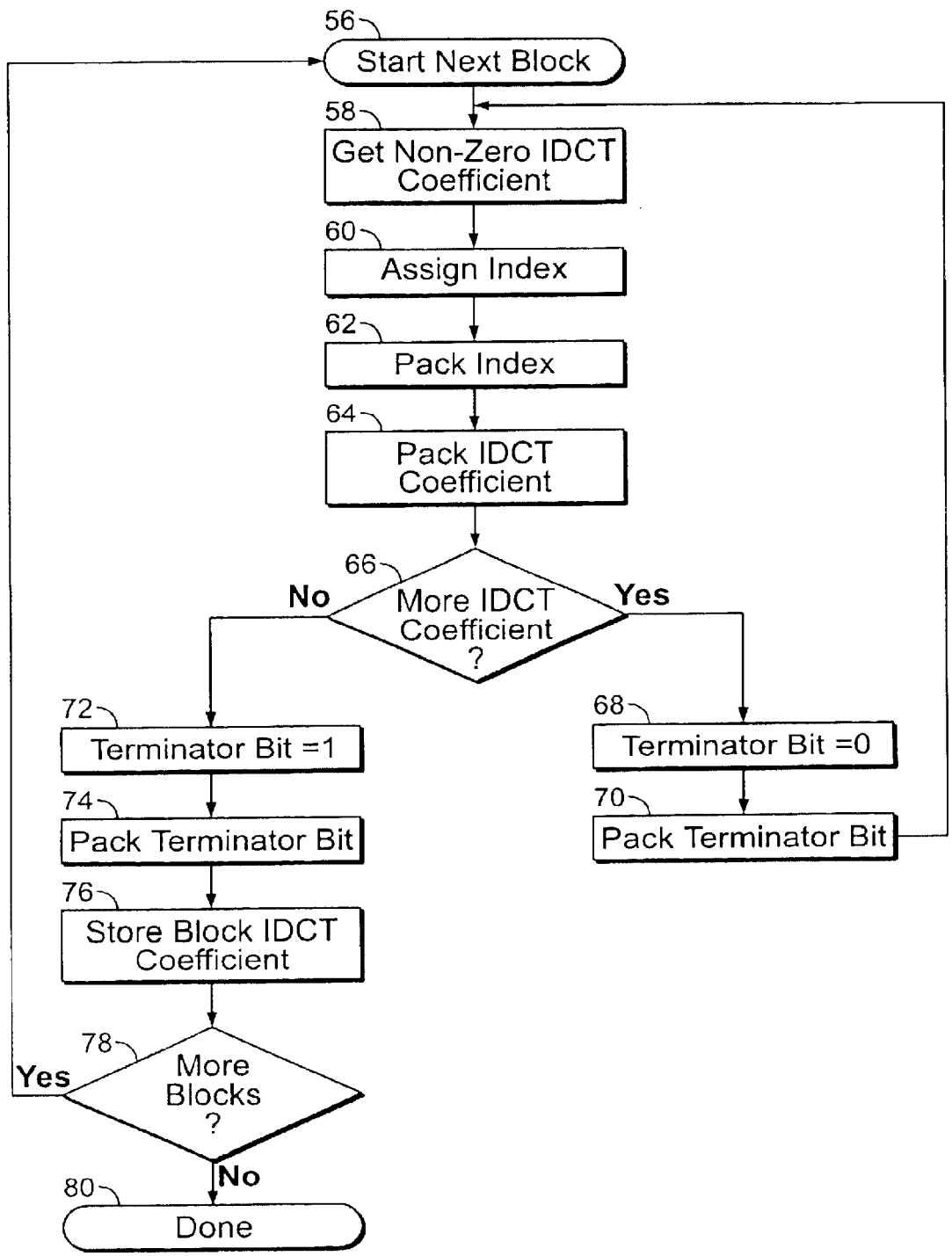
FIG. 5 illustrates a method for storing each non-zero IDCT coefficient across a 32 bit memory location according to a presently preferred embodiment of the present invention.

Referring now to FIG. 5, a method for storing each non-zero IDCT coefficient across a 32 bit memory location according to a presently preferred embodiment of the present invention is presented. One of ordinary skill in the art, however, will readily recognize that a different number of bits may be used. For each non-zero IDCT coefficient, the following method is performed. Each macroblock is processed individually. First, the next block within the macroblock is obtained at step 56. Next, at step 58, a non-zero IDCT coefficient is obtained. Next, at step 60, an index is assigned to the non-zero IDCT coefficient. Next, at step 62, the index is packed in a memory location. The index serves as an address, based on the horizontal scan direction. According to a presently preferred embodiment of the present invention, an inverse zig zag scan is performed to convert the MPEG-2 standard zig zag scan to the horizontal scanning convention. Those of ordinary skill in the art will readily recognize that such scanning methods are known in the art of video encoding and decoding. According to a presently preferred embodiment of the present invention, the first non-zero coefficient in each 8×8 block is 0.

Next, at step 64, the non-zero IDCT coefficient is packed in little endian format. The non-zero IDCT coefficient is packed in an available least significant position in memory. Therefore, the first coefficient is stored in the least significant memory location, or right most position. According to a presently preferred embodiment of the present invention, the coefficient data comprises 12 bits.

According to a presently preferred embodiment of the present invention, each 32 bit instruction comprises index and coefficient data, with the two most significant bits comprising terminator bits. Therefore, each coefficient and index are packed across multiple 32-bit words. Each terminator bit corresponds to one coefficient. A terminator bit may comprise a 0 or a 1. According to a presently preferred embodiment of the present invention, a 0 indicates that more coefficients follow within the current 8×8 block, while a 1 indicates that no more coefficients follow after the current one of this 8×8 block. According to the presently preferred embodiment of the present invention, the least significant terminator bit in the first 32 bit instruction is not used.

If it is determined at step 66 that more IDCT coefficients exist for the current block, a terminator bit for the current IDCT coefficient is set to 0 at step 68. Next, at step 70, the terminator bit corresponding to the non-zero IDCT coefficient is packed in one of two most significant bits of the memory location. The next non-zero IDCT coefficient for the current block is then obtained at step 58.

If it is determined at step 66 that no more coefficients exist for the current block, the terminator bit for the current IDCT coefficient is set to 1 at step 72. Next, at step 74, the terminator bit corresponding to the non-zero IDCT coefficient is packed in one of two most significant bits of the memory location. The IDCT coefficients for the current block are then stored in a location designated for the current macroblock at step 76. However, if the IDCT coefficients for the current block are originally stored in a location designated for the current macroblock, this step may be ignored. If at step 78, it is determined that there are no more blocks in the current macroblock, the process is completed at step 80. However, if there are more blocks in the current macroblock, the next block is obtained at step 56, the process is repeated. Those of ordinary skill in the art will readily recognize that the above steps are presented for illustrative purposes only. Moreover, those of ordinary skill in the art will similarly recognize that the steps may be performed in an alternate order to achieve the same result.

Figure 6:
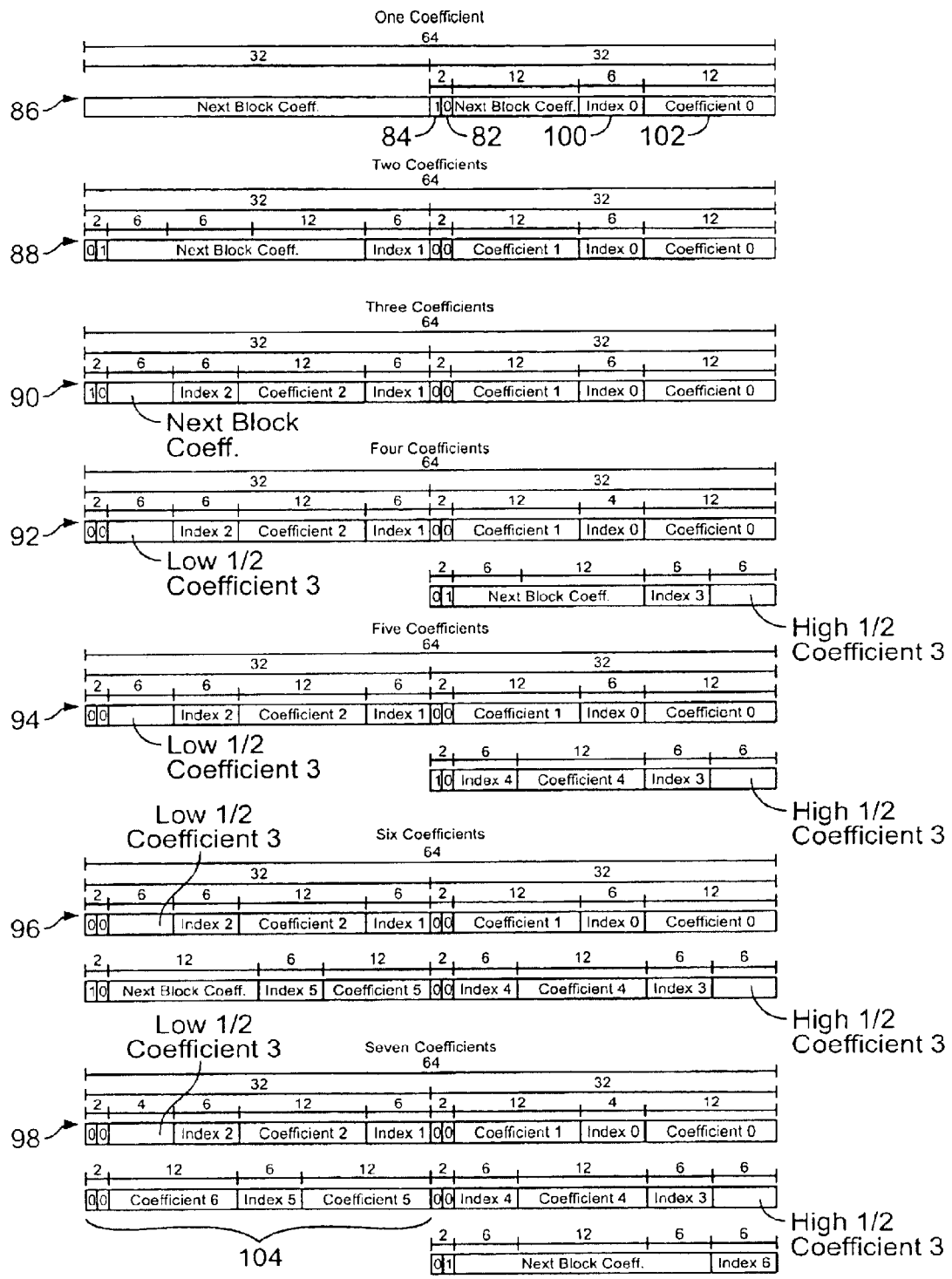
FIG. 6 illustrates terminator bit positions according to a presently preferred embodiment of the present invention.

Referring now to FIG. 6, terminator bit positions 82–84 are presented for blocks having one 86, two 88, three 90, four 92, five 94, six 96, and seven 98 coefficients. As shown, each index 100 and coefficient 102 are stored across 32 bit words 104. The terminator bit used for each instruction word repeats every 3 instruction words as shown. An n coefficient case, where n is greater than seven, is similar to an n–5 coefficient case. As a result, the IDCT coefficients are packed in a manner to minimize bus traffic and reduce the command queue size.

Figures 7, 8:
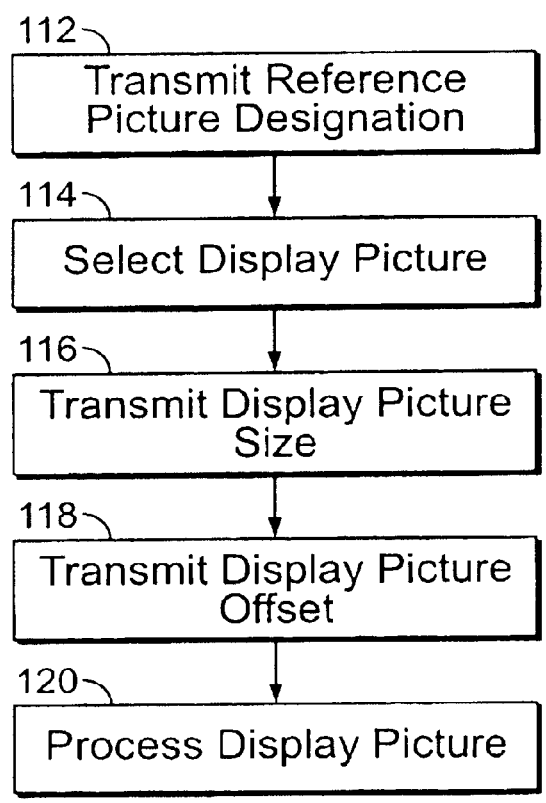
FIG. 7 illustrates possible index values according to a presently preferred embodiment of the present invention.
FIG. 8 illustrates a method for processing a display window within a reference picture according to a presently preferred embodiment of the present invention.

Referring now to FIG. 7, possible index values within an 8×8 block according to a presently preferred embodiment of the present invention are presented. According to the presently preferred embodiment of the present invention, the index comprises 6 bits, since the index comprises a binary number between 0 and 63 indicating a pixel position 106 within an 8×8 block. However, index 0 may not correspond to location 0. For example, index 0 108 may correspond to coefficient 8, and index 1 110 may correspond to coefficient 18, as shown.

According to a third aspect of the present invention, a method for allowing panning and shifting of a display window within a reference picture is provided. In this manner, a portion of a reference picture may be processed. Referring now to FIG. 8, a method for processing a display window within a reference picture is presented. First, a reference picture is designated at step 112. According to a presently preferred embodiment of the present invention, a reference picture size defining the reference picture is transmitted. According to a presently preferred embodiment of the present invention, the reference picture size includes a horizontal reference picture size in macroblocks and a vertical reference picture size in macroblocks. The reference picture size is then used by the motion compensation block. Second, a display picture is selected at step 114. According to a presently preferred embodiment of the present invention, a user may specify a display picture through the use of a mouse or other equivalent means for selecting a display picture. Third, a display picture size defining the display picture is transmitted at step 116. Similarly, the display picture size includes a horizontal and vertical display picture size, both designated in macroblocks. The horizontal and vertical display picture size may then be used by the motion compensation and the output reformatter blocks. Fourth, at step 118, a display picture offset defining a location of the display picture within the reference picture is transmitted to the motion compensation block. According to a presently preferred embodiment of the present invention, the display picture offset comprises delta x and delta y. Therefore, the display picture size may be less than the reference picture size. Moreover, the display picture offset provides a means for panning, or shifting, the display window within the reference picture. All non displayable macroblocks may then be stripped from the video stream prior to writing the instructions to the command queue. Thus, this provides greater flexibility than systems limiting the display picture size to that of the reference picture. Furthermore, only the display picture data rather than the reference picture data must be processed at step 120, resulting in a more efficient decoder. Moreover, this is particularly important in systems with limited memory. Those of ordinary skill in the art will readily recognize that the above steps are presented for illustrative purposes only. Moreover, those of ordinary skill in the art will similarly recognize that the steps may be interchanged to achieve the same result. According to a preferred embodiment, the above described methods may be implemented in software or firmware, as well as in programmable gate array devices, ASIC and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for processing a video stream prior to video dequantization of the video stream in a video decoder, the method comprising:

performing machine-executable instructions for VLC decoding of said video stream;

designating a reference picture within said video stream, said reference picture defining a picture area of macroblocks that are available for display;

selecting a display picture, said display picture defining as displayable macroblocks at least a portion of said macroblocks of said reference picture, wherein any remaining of said macroblocks of said reference picture are defined as non-displayable macroblocks;

denoting as one of a plurality of decoder instructions for decoding said displayable macroblocks a reference picture size defining said reference picture;

denoting as another of said plurality of decoder instructions a display picture size defining said display picture;

denoting as another of said plurality of decoder instructions a display picture offset defining a location of said display picture relative to said reference picture, wherein selective manipulation of said display picture offset enables panning of said display picture within said reference picture;

purging said non-displayable macroblocks from said video stream thereby leaving said displayable macroblocks as said display picture, wherein said displayable macroblocks form a modified video stream; and performing machine-executable instructions for encoding said plurality of decoder instructions, said decoder instructions being encoded within said modified video stream to control at least one hardware device within said video decoder.

2. The method according to claim 1, wherein said reference picture size further comprises:

a horizontal reference picture size comprising a number of macroblocks; and a vertical reference picture size comprising a number of macroblocks.

3. The method according to claim 2, wherein encoding decoder instructions within said modified video stream to control at least one hardware device within said video decoder further comprises:

sending said horizontal reference picture size to a motion compensation block of said video decoder; and sending said vertical reference picture size to said motion compensation block.

4. The method according to claim 1, wherein said display picture size further comprises:

a horizontal display picture size comprising a number of macroblocks; and a vertical display picture size comprising a number of macroblocks.

5. The method according to claim 4, wherein said encoding decoder instructions within said modified video stream to control at least one hardware device within said video decoder further comprises:

sending said horizontal display picture size to an output reformatter block of said video decoder, said output reformatter block being adapted for converting a 4:2:0 macroblock format to a 4:2:2 scan line format; and sending said vertical display picture size to said output reformatter block adapted for converting a 4:2:0 macroblock format to a 4:2:2 scan line format.

6. The method according to claim 4, wherein said encoding decoder instructions within said modified video stream to control at least one hardware device within said video decoder further comprises:

sending said horizontal display picture size to a motion compensation block of said video decoder; and sending said vertical display picture size to said motion compensation block.

7. The method according to claim 1, wherein said display picture offset further comprises a horizontal display picture offset comprising a number of macroblocks and a vertical display picture offset comprising a number of macroblocks and said encoding decoder instructions within said modified video stream to control at least one hardware device within said video decoder further comprises:

sending said horizontal display picture offset to a motion compensation block of said video decoder; and sending said vertical display picture offset to said motion compensation block.

8. An apparatus for processing a video stream prior to video decoding of the video stream in a video decoder, the apparatus comprising:

means for performing machine-executable instructions for VLC decoding of said video stream;

means for designating a reference picture within said video stream, said reference picture defining a picture area of macroblocks that are available for display;

means for selecting a display picture, said display picture defining as displayable macroblocks at least a portion of said macroblocks of said reference picture, wherein any remaining of said macroblocks of said reference picture are defined as non-displayable macroblocks;

means for denoting, as one of a plurality of decoder instructions for decoding said displayable macroblocks a reference picture size defining said reference picture;

means for denoting as another of said plurality of decoder instructions a display picture size defining said display picture;

means for denoting as another of said plurality of decoder instructions a display picture offset defining a location of said display picture relative to said reference picture, wherein selective manipulation of said display picture offset enables panning of said display picture within said reference picture;

means for purging said non-displayable macroblocks from said video stream thereby leaving said displayable macroblocks as said display picture, wherein said displayable macroblocks form a modified video stream; and means for performing machine-executable instructions for encoding said plurality of decoder instructions, said decoder instructions being encoded within said modified video stream to control at least one hardware device within said video decoder.

9. The apparatus according to claim 8, wherein said reference picture size further comprises:

a horizontal reference picture size comprising a number of macroblocks; and a vertical reference picture size comprising a number of macroblocks.

10. The apparatus according to claim 9, wherein said means for encoding decoder instructions within said modified video stream to control at least one hardware device within said video decoder further comprises:

means for sending said horizontal reference picture size to a motion compensation block of said video decoder; and means for sending said vertical reference picture size to said motion compensation block.

11. The apparatus according to claim 8, wherein said display picture size further comprises:

a horizontal display picture size comprising a number of macroblocks; and a vertical display picture size comprising a number of macroblocks.

12. The apparatus according to claim 11, wherein said means for encoding decoder instructions within said modified video stream to control at least one hardware device within said video decoder further comprises:

means for sending said horizontal display picture size to an output reformatter block of said video decoder, said output reformatter block being adapted for converting a 4:2:0 macroblock format to a 4:2:2 scan line format; and means for sending said vertical display picture size to said output reformatter block adapted for converting a 4:2:0 macroblock format to a 4:2:2 scan line format.

13. The apparatus according to claim 11, wherein said encoding decoder instructions within said modified video stream to control at least one hardware device within said video decoder further comprises:

means for sending said horizontal display picture size to a motion compensation block of said video decoder; and means for sending said vertical display picture size to said motion compensation block.

14. The apparatus according to claim 8, wherein said display picture offset further comprises a horizontal display picture offset comprising a number of macroblocks and a vertical display picture offset comprising a number of macroblocks and said encoding decoder instructions within said modified video stream to control at least one hardware device within said video decoder further comprises:

means for sending said horizontal display picture offset to a motion compensation block of said video decoder; and means for sending said vertical display picture offset to said motion compensation block.

15. An apparatus for processing a video stream, said video stream having been VLC decoded and including video frame data containing a designated reference picture that defines a picture area of macroblocks that are available for display, wherein said reference picture has a selected display picture that defines as displayable macroblocks at least a portion of said macroblocks of said reference picture and that defines any remaining of said macroblocks of said reference picture as non-displayable macroblocks, wherein said non-displayable macroblocks have been purged from said video stream thereby leaving said displayable macroblocks as a modified video stream, wherein said modified video stream has been encoded, the apparatus comprising:

a memory to store said video frame data and a plurality of commands associated with said video frame data, wherein said plurality of commands are for decoding said displayable macroblocks and are encoded within said modified video stream, said plurality of commands include a horizontal display picture offset defined by a number of macroblocks and a vertical display picture offset defined by a number of macroblocks, said horizontal and vertical display picture offsets delineate a location of said display picture relative to said reference picture; and a command queue manager coupled to said memory, said command queue manager configured to:

receive said video frame data and said plurality of commands from said memory;

decode said plurality of commands; and send said video frame data and at least one of said plurality of commands to at least one video block for video decoding, said at least one video block comprising a motion compensator, wherein said motion compensator is configured to receive said horizontal display picture offset and said vertical display picture offset and selective manipulation of said display picture offsets enable panning of said display picture within said reference picture.

16. The apparatus according to claim 15, wherein said plurality of commands further comprise:

a horizontal reference picture size comprising a number of macroblocks; and a vertical reference picture size comprising a number of macroblocks.

17. The apparatus according to claim 16, wherein said at least one video block further comprises a motion compensation block and said command queue manager is further configured to:

send said horizontal reference picture size to said motion compensation block; and send said vertical reference picture size to said motion compensation block.

18. The apparatus according to claim 15, wherein said plurality of commands further comprise:

a horizontal display picture size comprising a number of macroblocks; and a vertical display picture size comprising a number of macroblocks.

19. The apparatus according to claim 18, wherein said at least one video block further comprises an output reformatter to convert a 4:2:0 macroblock format to a 4:2:2 scan line format and said command queue manager is further configured to:

send said horizontal display picture size to said output reformatter; and send said vertical display picture size to said output reformatter.

20. The apparatus according to claim 18, wherein said at least one video block further comprises a motion compensation block and said command queue manager is further configured to:

send said horizontal display picture size to said motion compensation block; and send said vertical display picture size to said motion compensation block.

* * * * *